United States Patent
Nandagopal

(10) Patent No.: US 11,429,257 B1
(45) Date of Patent: Aug. 30, 2022

(54) DYNAMICALLY GENERATED HELP BASED ON DERIVED HIERARCHICAL CONTEXT

(71) Applicant: salesforce.com, inc., San Francisco, CA (US)

(72) Inventor: Lokesh Kumar Nandagopal, Tamil Nandu (IN)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 17/232,045

(22) Filed: Apr. 15, 2021

(51) Int. Cl.
  *G06F 3/0484* (2022.01)
  *H04L 67/50* (2022.01)

(52) U.S. Cl.
  CPC .......... *G06F 3/0484* (2013.01); *H04L 67/535* (2022.05)

(58) Field of Classification Search
  None
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |

(Continued)

*Primary Examiner* — Mandrita Brahmachari
(74) *Attorney, Agent, or Firm* — Schwabe Williamson & Wyatt

(57) ABSTRACT

To assist with using a network based application program, a context-aware help interface is provided. The help interface may be dynamically updated and contemporaneously displayed along with a user interface. User interface accesses, such as from client use of the application program, may be tracked and used to identify contexts for the client. A context includes identifying a current application program feature or functionality accessed by the client. A hierarchical context identifier may be determined by tracking multiple user interface accesses. The hierarchical context identifier may be used to search for help content to display in the help interface. Search results may be optimized for content and presentation. Artificial intelligence may be employed to identify, based at least in part on accesses represented by one or more hierarchical context identifier, a client's experience level or needs so that help content may be tailored appropriately.

24 Claims, 7 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0268234 A1* | 12/2005 | Rossi, Jr. ............... G06F 9/453 |
| | | 715/705 |
| 2007/0281731 A1* | 12/2007 | Attride ............. H04M 1/72448 |
| | | 455/550.1 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0246880 A1* | 10/2011 | Horton ................. G06F 3/0481 |
| | | 715/708 |
| 2011/0247051 A1 | 10/2011 | Bulumulla |
| 2012/0042218 A1 | 2/2012 | Cinarkaya |
| 2012/0233137 A1 | 9/2012 | Jakobson et al. |

(56) References Cited

U.S. PATENT DOCUMENTS

| | | |
|---|---|---|
| 2012/0290407 A1 | 11/2012 | Hubbard et al. |
| 2013/0097498 A1* | 4/2013 | Steinberg .............. G06F 3/0482 715/708 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0154526 A1* | 6/2015 | Yates ............... G06Q 10/06393 705/7.39 |

\* cited by examiner

FIG. 5A 500

```
502  on('helpPageContextChanged', async (event) => {        512
504    const context = event.context;
506    sessionStorage.setItem('helpContext', context);
508    const content = await helpContentRetriever.fetch(context);   514
510    helpContainer.update(content);
     });
```

FIG. 5B 520

```
522  on('helpPageContextChanged', async (event) => {
524    const context = event.context;
526    sessionStorage.setItem('helpContext', context);
     });
```

FIG. 5C

```
                                                              ← 540
                      ┌ 542
            on('helpContainerOpen', () => {
                ┌ const context = sessionStorage.getItem('helpContext');
           544 ╱
                ┌ const content = await helpContentRetriever.fetch(context);
           546 ╱
                ┌ helpContainer.update(content);
           548 ╱   });
```

FIG. 5D

```
                                                              ← 560
           ┌ {
       562 ╱
              ┌ context: "Manage VM",
          564 ╱
              ┌ details: {
          566 ╱
                  ┌ "managedObjectId": "vm_id",
              568 ╱
                  ┌ vmOs: "linux",
              570 ╱
                    operations: ["Increase VM CPU"]
                                                  ╲ 572
                  }
              }
```

US 11,429,257 B1

DYNAMICALLY GENERATED HELP BASED ON DERIVED HIERARCHICAL CONTEXT

TECHNICAL FIELD

One or more implementations relate to the field of context-aware help systems in a network based application program; and more specifically, to tracking application program accesses and dynamically determining help content based on multiple factors including how the application program has been accessed.

BACKGROUND ART

Most software, whether provided as a standalone application program, browser based, web based, within and/or as part of a platform or combination of the foregoing, provides a help functionality to assist a client of the software and/or a user of the client and/or application program (e.g., the user may use the application program or use a client that is engaged with the application program, or both). Getting help often requires opening a separate help application (e.g., it may be manually started, or automatically spawned). With the advent of prevalent network connections to the Internet and other networks, while preliminary or basic help documentation may be built in to the application program, more substantive help documentation is often located at a resource accessible over the Internet.

Seeking application program help, for example, results in accessing the documentation from a website. Sometimes an application program has a limited help interface and brings up a main access point for the help and the client then needs to indicate what program feature for which help is desired. Other times, the application program may provide a limited context sensitivity in that it may recognize the client is accessing a particular function of the application program and the help may automatically call up initial help for the particular function. To make use of the help the client needs to switch back and forth between the help system and the application program; this back-and-forth does not provide a smooth help experience.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIGS. 5A-5C illustrate pseudo-code according to some implementations for tracking User Interface interaction and determining corresponding Help Content.

FIG. 5D illustrates pseudo code for an exemplary data structure to represent hierarchical context tracked during UI interaction.

DETAILED DESCRIPTION

Figure 1:
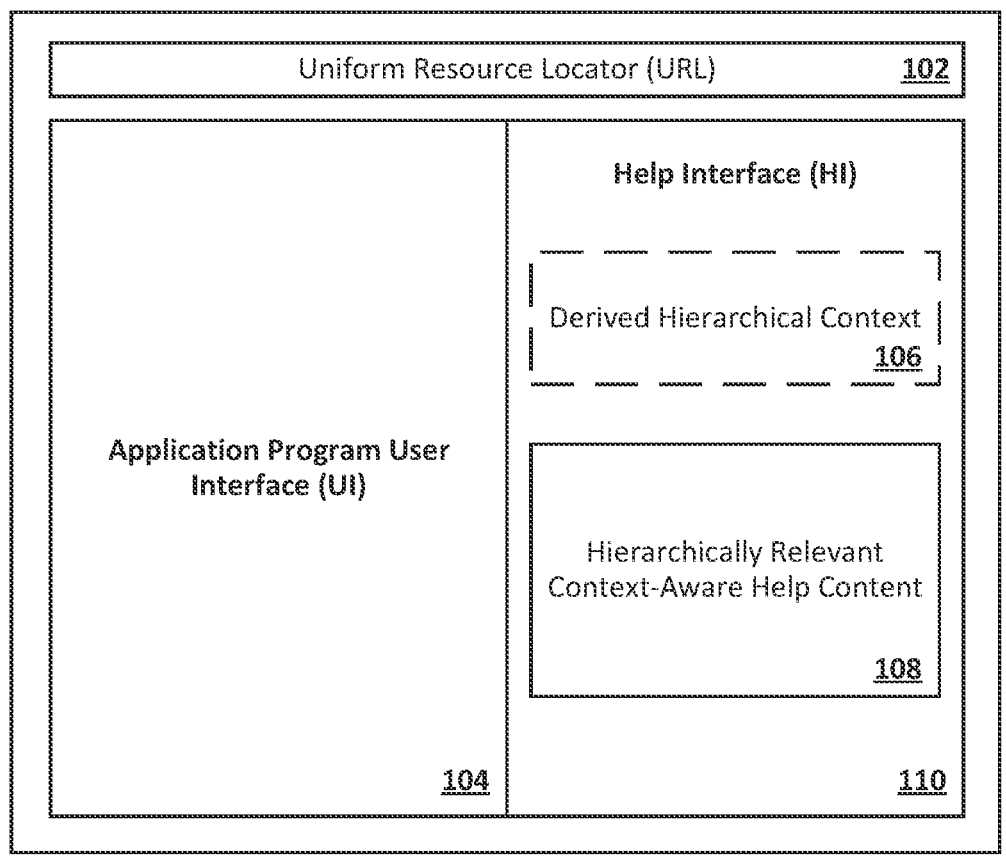
FIG. 1 illustrates an application program interface 100 according to an exemplary implementation.

The following description describes implementations for providing a network-based application program having, among other features, a User Interface (UI) that may be presented along with a dynamically updateable context-aware and historical-context aware Help Interface (HI). As will be discussed in more detail below, a network-aware and/or network-coupled computing platform may execute applications for the client, where the computing platform includes the network-based application program.

It will be appreciated the term "execute" includes various techniques for making the application program available, including a processor performing operations stored in a file, as well as a computing platform providing an environment that may interpret instructions. For example, a computing platform may execute or otherwise make available a network application program such as a browser, which may be an "Internet" browser type of program that may evaluate/interpret/execute/etc. network accessible resources such as those written in markup languages such as Hypertext Markup Language (HTML), eXtensible Markup Language (XML), eXtensible Hypertext Markup Language (XHTML), etc., written in or combined with programming languages such as Java, Javascript, TypeScript, PHP, etc., or written in another language.

It will be appreciated there are many different languages that may be used and these are just an exemplary few that are known to those skilled in the art. The browser may be provided to a client. It will be appreciated in one embodiment, a client may refer to the device in which the browser is being executed (and accessing remote network resources, servers, etc.), and there may be one or more user of the client that interacts with the client to generate operations/commands/UI activity. It will be appreciated the client need not have a local user operating it, and that the client may be under operation from another source or location, such as a remote user. It will also be appreciated the client may be self-directed such as by way of an Artificial Intelligence, Expert System, or other autonomous action system.

To help a user make use of an application program, a help interface is typically provided. Some help systems are entirely passive, e.g., when called on a user is presented with a starting/landing page for the help and the user needs to search for relevant help. Other application programs attempt to provide some context awareness, e.g., to provide help to the user based on a current operation being performed in the application program. Examples of limited context aware help systems may be found, for example, at Internet Uniform Resource Locator (URL) addresses www!manualise-!com/en/blog/guest-blog/contexthelp (user manually identifies context), pronovix!com/blog/overview-context-sensitive-and-embedded-help-formats (tooltips, guides), www!screensteps!com/contextual-help (user enters help query and receives context-aware response), and www!re-searchgate!net/publication/328313628_Generating_Contextual_Help_for_User_Interfaces_ (related to generating help from requirements documents). To prevent inadvertent hyperlinks in this document, http(s) references are removed from URLs and periods "." replaced with exclamation points "!". As will be appreciated from the following discussion, a help interface may be designed so that it automatically tracks/monitors interaction with a User Interface, and based on monitoring, dynamically prepare help content for a Help Interface.

FIG. 1 illustrates an application program interface 100 according to an exemplary implementation. It will be appreciated an application program may be a standalone product and/or implemented in another format, such as a web-based network-aware application as may be implemented in conjunction with a web browser or similar software environment. In the illustrated embodiment, assume a browser embodiment for an application program is employed. In this implementation, the browser may display a web page as an application program interface 100. Within the interface, there may be a Uniform Resource Locator (URL) 102 identifying the present location within the application program. That is, in browser-based application programs, a client accessing a User Interface (UI) 104 of the application program would generate events while accessing the interface, e.g., generating click events for elements in the interface, focus change events, keyboard (typing) events, etc.

Various accesses and/or events corresponding to interactions with the UI may change the content of the URL 102 in accord with the accesses. For example, if the client drills down to successive layers of options in a program feature, each UI access to get to a new location in the application program may result in successive changes to the URL. These URL changes may be monitored and used to determine a hierarchy of accesses to the UI and in turn used to provide help content relevant not only to a particular application program function or feature currently being accessed by a client, but also relevant to the hierarchy and/or history of accesses that led to the current application program function/feature. As a more specific example, assume the application program provides for managing virtual machines (VMs). Accesses of the UI 104 may be monitored, and a hierarchy of contexts may be derived and stored by a client and/or server (storing may be in a client and/or server cache). UI access may indicate accessing an application program feature to, for example, Manage VMs, then track UI access for selecting a particular Datacenter to manage, then track UI access for selecting a specific VM to manage, and then track UI access for a particular application program function, such as Take Snapshot.

Each of these accesses changes the URL 102 and the sequence of accesses, may be used to provide a meaningful derived hierarchical context 106 of how the Take Snapshot function had been reached. This context may represent more than simply where are we now in the application program and instead may indicate how we arrived there, e.g., what accesses led to this current state of the application program. In the illustrated embodiment, the derived context is illustrated with dashed lines to represent context data that is maintained by a client and/or server that may be used at least in part as discussed further below to determine hierarchically-relevant context-aware help content 108 for display in a Help Interface (HI) 110 within the application program interface 100.

It will be appreciated a Help Content Retriever Server (see, e.g., FIG. 3) may identify characteristics associated with monitored accesses, e.g., the server may analyze a derived hierarchical context 106 to identify a client has accessed, for example, a particular type of VM (e.g., Linux, Windows, OS X, etc.), and use associated characteristic and/or other identified characteristics associated with the derived context, to update and/or refine help content 108 provided to a client in the HI 110. It will be appreciated by one skilled in the art that the FIG. 1 implementation of a UI 104 along-side a HI 110 containing corresponding hierarchically-relevant context-aware help content 108 may be referred to as a dynamically updateable context-aware help service. It will be further appreciated the illustrated configuration of the various portions and/or component of the application program interface 100 are exemplary and may change and/or be differently organized and/or configured without departing from the teachings presented herein.

Figure 2:
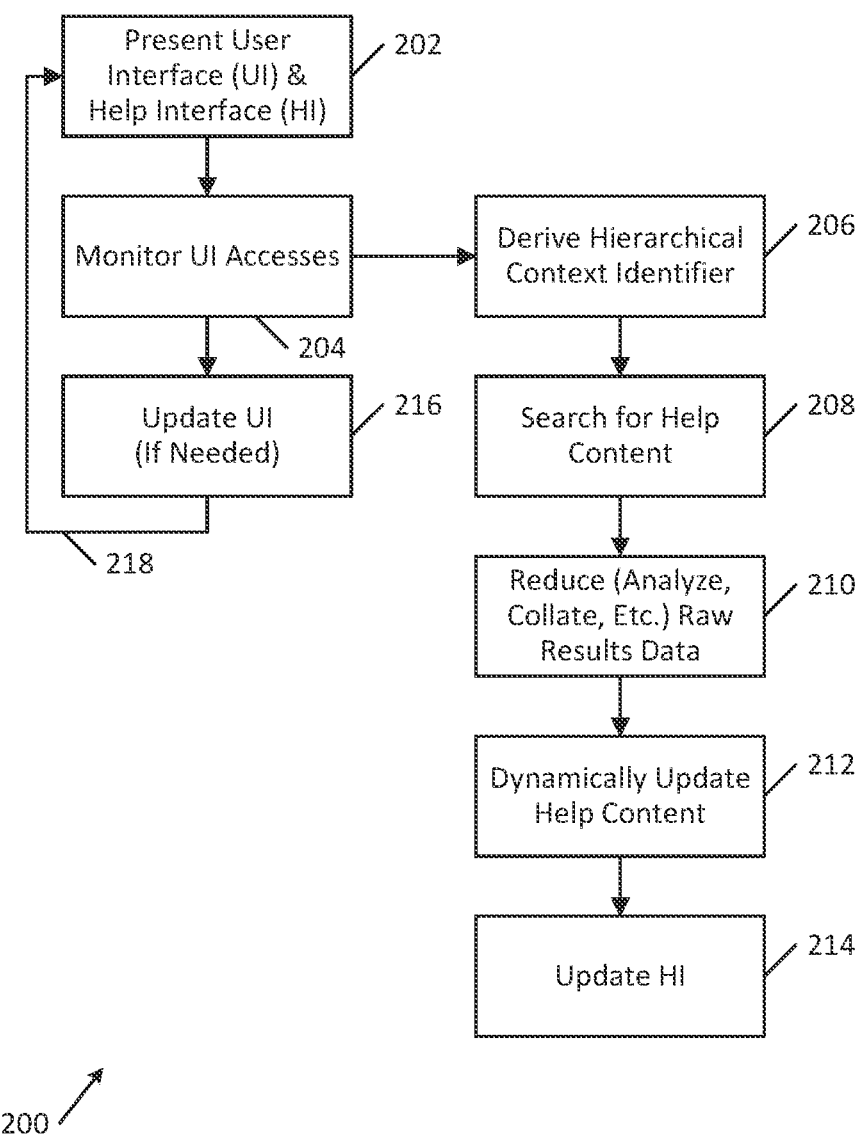
FIG. 2 is a flow diagram illustrating presenting a User Interface (UI) alongside a dynamically updated Help Interface (H) according to some example implementations.

FIG. 2 is a flow diagram 200 illustrating presenting 202 a User Interface (UI) alongside a dynamically updated Help Interface (HI) according to some example implementations. The UI and HI may be, for example, the FIG. 1 UI 104 and HI 110. Activity within the UI may be monitored 204 for access, such as by the FIG. 3 UI monitor 306. Activity may derive from monitoring and/or tracking accesses to one or more of a variety of sources, local and/or remote, as well as interacting with elements in the UI and generating associated events based at least in part on that interaction. See also the FIG. 3 and FIG. 6 discussions. For expository convenience, assume activity of a local user of the client engaging with the UI of an application program such as a browser. But, it will be appreciated accesses to and activity within any application program may be monitored and provided help as discussed herein.

Based at least on the monitoring, a hierarchical context identifier may be derived 206 that corresponds to client accesses of the UI. It will be appreciated when the application program starts, the state of the user can be considered new, and if help is requested, what may be displayed in the HI may be initial help to get what might be a new user up to speed with essential and/or basic concepts for using the application program. This initial help and/or other initial information that is desired to be presented to the client is to assist a client that has yet to substantively interact with the application program, and hence there is little context for providing more detailed help content responsive to the request for help. However, as the user accesses the application program, and interacts with its UI to access program features and/or otherwise navigate within the application program (which result in detectable events), these accesses represent an activity trail that may be monitored 204 and used at least in part to provide meaningful context-aware help content to the client.

It will be appreciated many different data structures may be used, such as a graph (e.g., directed, acyclic (DAG), etc.) or other structure that may track a hierarchy of movement within the User Interface (UI). Loop detection may be applied to identify situations where a client traverses the UI and loops back within the UI and/or repeats a request for help on a feature and/or function of the application program. Repeated requests and/or looping may be used to infer a user seems to be struggling with a feature/function/aspect of the application program. It will be appreciated repeat requests may be tracked across program invocation, as well as within a particular invocation of the application program. In addition, UI accesses may be evaluated for whether next steps are expected or unexpected. For example, if the client appears to choose an unlikely next operation in a UI, this may suggest the client is having difficulty understanding how to proceed in the UI to use a certain feature/function, or it may suggest the client is having difficulty understanding a current feature/function. In some exemplary implementations, weights may be associated with graph transitions to accommodate tracking UI loops, repeated help with a feature/function, etc., with heavier weighting given to repeated help for the feature/function.

For example, if the application program is a web browser, then clicking links (e.g., objects, anchor text, hyperlinks or other elements in the UI) represents accessing elements in the UI having an associated network address to a local and/or remote network-accessible resource. The links and/or components thereof represent successive actions taken in the UI that may be represented, such as in a graph. The hierarchy, in one implementation, represents a traversal through application program features. It will be appreciated the traversal may track every click/event that occurs in the application program, track milestones reached during traversal of the UI and application program features/functions, and/or track other activity within the UI of interest to the application program developer. It will be appreciated milestones may be associated with specific application program features, functions, etc., as well as cumulative usage time in the application program, cumulative time spent using a particular feature, function, etc., frequency of accessing a particular help topic (which may encompass multiple relevant application program features, functions, etc.), depth of UI traversal, or any other characteristic associated with UI traversal that may be used to identify and/or assist with identifying help content to be presented to a client. In one implementation, help topics associated with multiple related aspects of the UI and/or functionality of the application program may be grouped together, and reaching any of these grouped elements may result in the same help content being provided.

Let's assume for convenience we derive 206 a hierarchical context identifier based at least in part on the monitored 204 tracking accessing of one or more URL hyperlinks which identify a UI element clicked on, e.g., a specific application program feature or function, as well as some or all of the traversal path/URL that led to the element that was clicked on. As discussed above the hierarchical context identifier may track an arbitrary amount of UI interaction to represent a context of client accesses of the UI. It will be appreciated different data structures may be used to implement the hierarchical context identifier. Implementation design choice may be constrained by programming environment(s) in use for a particular application program, as well as based at least in part on the type of activity to be tracked, the information desired to be stored, and/or the nature of the client(s) accessing the application program. For example, in a web based application program, where a client is a web browser or otherwise incorporates web browser communication functionality, then the data structure may be based on a text-based structure used to define, store, and access data. Exemplary programming environments include the eXtensible Markup Language (XML), JavaScript Object Notation (JSON), see also FIG. 5D discussion, and the like.

The hierarchical context identifier may then be used, at least in part, to search 208 for help content. It will be appreciated any local and/or remote or back-end search service/search server may be used to perform the search for help content. In this illustrated exemplary implementation, let's assume searching is by way of providing the hierarchical context identifier to a search service such as one based on an elastic search. One skilled in the art will appreciate Elastic searching refers to a kind of multi-tenant distributed search environment that may be used to search any type of document, and that different search services may provide an elastic-type of search even if not called as such. As one example, see the Elastic search company at URL elastic!co.

See also knowi!com/blog/what-is-elastic-search. And refer to FIG. 3 items 304, 322 regarding search servers/search services. See also FIG. 5 for pseudo-code 500, 520, 540 corresponding to exemplary active (e.g., including an immediate help content retrieval) and passive (e.g. including a delayed help content retrieval) implementations for deriving 206 and searching 208 for help content. Based on elastic and/or other search environment, multiple raw results data may be returned, e.g., from a FIG. 3 Help Content Retrieval Server 304 to a Help Content Retrieval Client 302, and they may be returned in multiple formats. It will be appreciated there may be duplicate results depending on the sources used for searching, as well as result content not particularly relevant to the hierarchical context identifier for the application program.

Therefore help content search results may be reduced 210, which may entail, for example applying filters and/or processing routines/programs to perform modification to the results such as, but not limited to: removing duplicates, removing or consolidating similar results, removing nonessential data in results, distilling and/or summarizing results into a more compact and/or focused result, removing structure surrounding a result (e.g., extracting relevant result content from a larger document such as extracting content from web page data), converting a result from one format to another for incorporation into the HI, etc. It will be appreciated known artificial intelligence and/or machine learning techniques may be applied to analyze, collate, and de-duplicate data to reduce the search results. It will be appreciated reducing results may be performed with respect to existing help content already present in the HI and/or a help cache.

After reducing 210 search results, help content that may be displayed in the HI may be dynamically updated 212 with the reduced help content. In one implementation. "dynamically" is intended to indicate in the illustrated implementation, a client and/or user of the client need not act in order for the help content for the application program to be update in accordance with the derived 206 hierarchical context identifier. In another implementation, e.g., a "passive" implementation such as discussed for FIGS. 5B, 5C, certain help content updates may be deferred until a certain action/activity/User Interface (UI) event is identified. In the illustrated implementation, once the help content has been updated, the HI may be updated 214 with the updated help content. This may occur whether the HI is visible or not. If needed, the content of the User Interface (UI) may be updated 216 if desired in accord with the help content update. For example, the UI may update to show hints, highlights, or other options to the client as a result of getting the updated help. After updating 214, 216, Application program control may then loop 218 back to presenting 202 the UI and HI.

It will be appreciated the updating 214, 216 items may be performed contemporaneously. However, it will be appreciated either updating operation may be performed one before the other, or performed one asynchronously to the other. For example, if the Help Interface (HI) is left open while a client accesses the User Interface (UI) to use an application program, the HI may be continuously updated asynchronously to the UI accesses so that it continues to present help content relevant to the accesses of the UI. Further, updating 216 the UI may be unnecessary and after updating 214 the HI, the application program may instead loop 218 back without updating 216 the UI.

Figure 3:
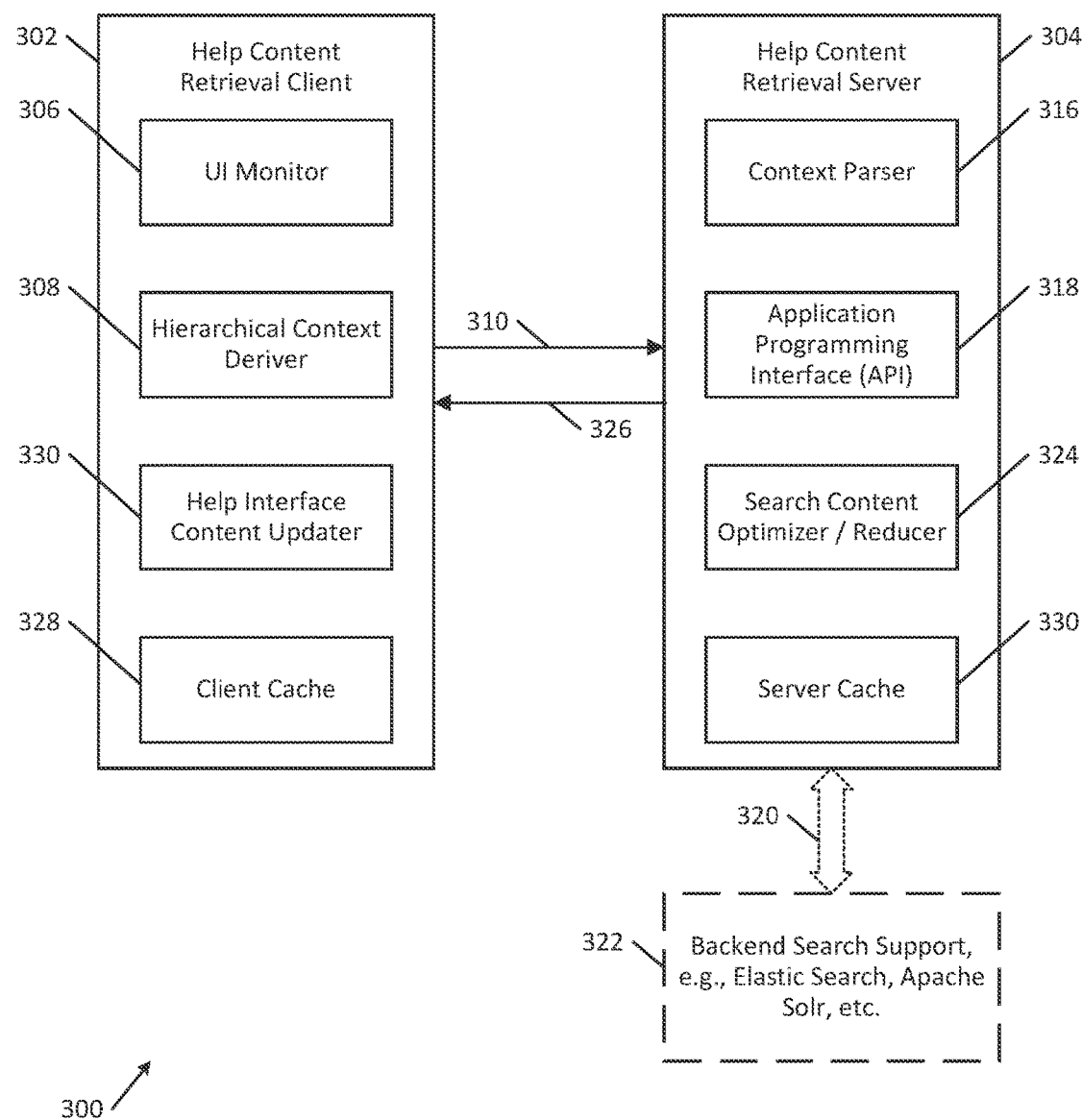
FIG. 3 is a block diagram illustrating a Help Content Retriever Client in communication with a Help Content Retriever Server according to some example implementations.

FIG. 3 is a block diagram 300 illustrating a help content retrieval client 302 in communication with a help content retrieval server 304 according to some example implementations. As discussed above, exemplary implementations disclose presenting a product interface with an interaction portion (e.g., FIG. 1 User Interface (UI) 104) and a help portion (e.g., FIG. 1 Help Interface (HI) 110). They may be presented side-by-side as illustrated in FIG. 1 or they may be presented in some other arrangement or format as desired.

As illustrated the help content retrieval client 302 may communicate with a help content retrieval server 304 to obtain help content for display in the HI. Context sensitive help may be derived by monitoring use of the UI with a UI monitor 306. In the illustrated embodiment, the blocks represent features and functionality that may be programmed in one or more programming languages and/or expressed in hardware as a programmable or fixed circuit in order to perform the functionality disclosed herein. Assuming the application program is presented in, for example, a browser, it will be appreciated the retrieval client may actively track interactions with the application program interface, including UI accesses. The monitored accesses may be used by a hierarchical context deriver 308 for generating a derived hierarchical context that tracks how a user navigated/traversed through the product interface to a current location in the product. The hierarchical context may refer to a complete audit trail, or selected ones of the operations/clicks/etc. taken in the application program.

The derived hierarchical context may be sent 310 to the help content retrieval server 304. It will be appreciated the server may be one of many servers provided by a help content retrieval service. The server may include a context parser 316 that may process the derived hierarchical context to extract information from the context to be used for performing a search for relevant help content. The context may identify key words, tokens, application program feature/function names, UI URL components, etc. that may be extracted by the parser. It will be appreciated the retrieval server may support use of an API 318 to facilitate use of the retrieval server. (See, FIG. 5.) A retrieval server may send, over a communication link 320, extracted context information to a backend search support 322, such as an elastic search provider 322 such as Elastic Search, Apache Solr or the like. It will be appreciated the elastic search is proposed for expository convenience and that other search providers and or search technologies may be used instead and/or in combination. It is assumed familiarity with elastic searching is known. One or more results may be returned over the link 320 to the help content retrieval server 304.

The help content retrieval server 304 may include an optimizer/reducer 324 that may process search results and reduce them, e.g., rank, de-duplicate, convert, truncate, simplify, summarize, etc., and provide 326 reduced results back to, e.g., the help content retrieval client 302 through API 318 for presentation in a help portion in the HI. A help interface content updater 330 may interface with the Help Content Retrieval Server 304 by way of the API 318 or other method, and update the HI with the provided 326 reduced results and/or with content from the client cache 328. Results may also be personalized. One personalization would be to annotate or otherwise modify results to specifically refer to the client performing the search, or otherwise mention characteristics of the client to make results more personal to the client. Another personalization may be when a multi-tenant search tool is used by multiple entities and results are received by different tenants, where results are similar due to having performed similar searches, and the results are treated as akin to a template that is then personalized for each searching client. This multi-tenant scenario may arise, for example, when a help content retrieval server is caching help content and hence the cache may contain hits that apply to multiple clients.

Help content may be cached client and/or server-side, e.g., in client cache 328, or server cache 330, to accommodate repeated help need, user looping around the product interface, overlapping help content results, etc. The client cache may include content desired to be 'instantly' available, such as top-level help, as well as selected derived/generated help chosen based on criteria such as developer-identified critical help, user need, or customer trends.

Figure 4:
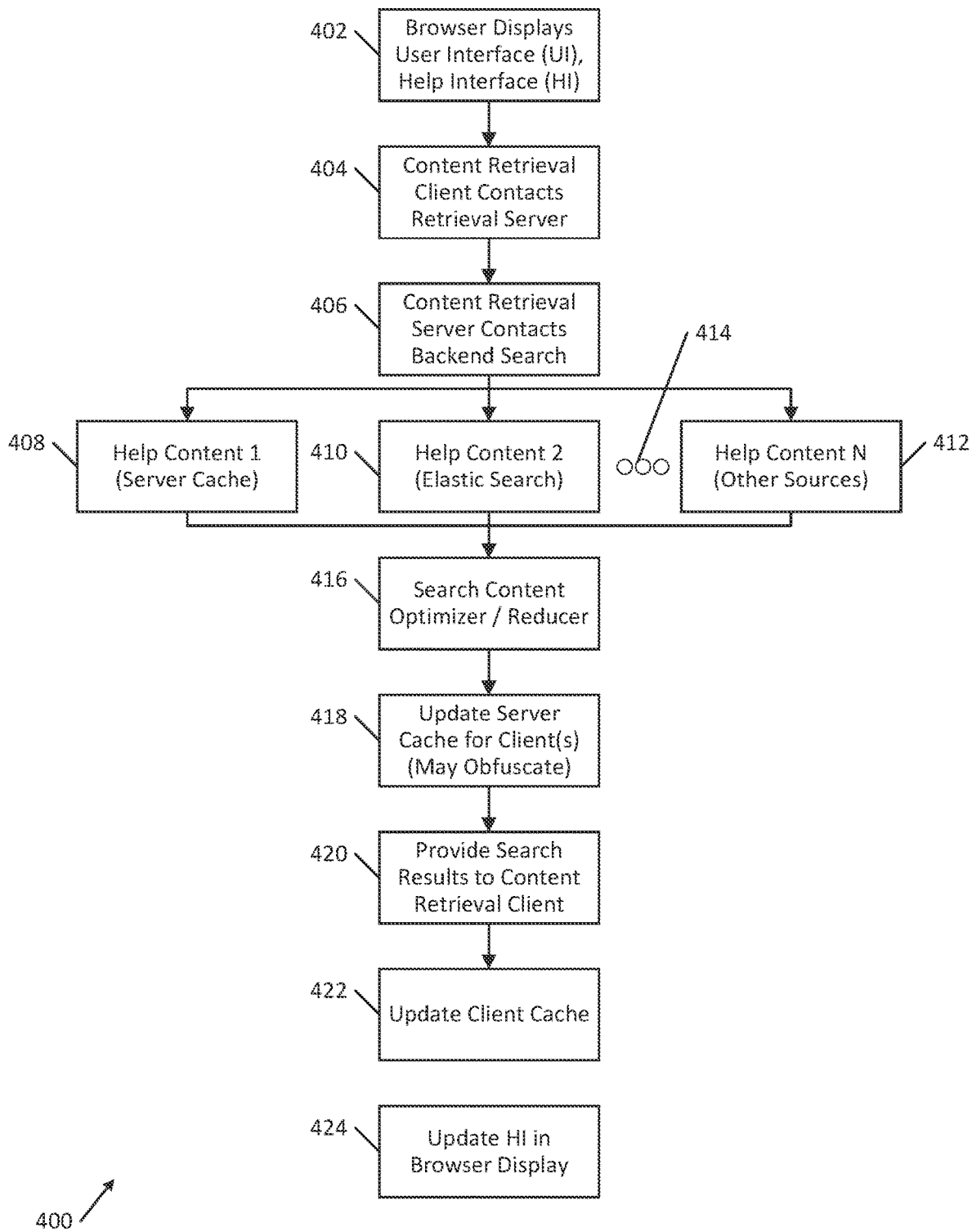
FIG. 4 is a flow diagram illustrating exemplary operations relating to an interaction with a User Interface (UI) and dynamically determining data for a Help Interface (HI) according to some example implementations.

FIG. 4 is a flow diagram 400 illustrating exemplary operations relating to an interaction with a User Interface (UI) and dynamically determining data for a Help Interface (HI) according to some example implementations. Assume an application program is implemented within a browser, e.g., such as discussed above with respect to FIG. 1, and activity within the UI is tracked to derive a hierarchical context corresponding to the UI accesses. The browser may display 402 the UI and HI, and the content retrieval client may contact 404 the retrieval server to provide hierarchical context to the retrieval server.

The retrieval server may contact 406 multiple local and/or remote search services and/or resources 408-412 for receiving help content, including backend search support as discussed above. The illustrated ellipses 414 represent there may be many different resources from which to obtain help content, hence item 412 represents the Nth content resource of an arbitrary number of resources to be utilized. Each of these resources may be accessed in parallel and/or in any desired order, e.g., one may first look for content in a local resource such as a cache before seeking content from a remote server. In some implementations, with every update to the hierarchical context, e.g., when a feature or function of the UI is accessed, a search is automatically performed so that the help content for the HI is automatically and substantially continuously updated with UI use. (See, e.g., FIG. 5A discussion.) One exemplary resource 408 may include a cache maintained and/or controlled by the content retrieval server. The contents of the cache may affect what is presented to the backend search support, such as to remove context from the backend search support's search if already in the server cache.

Another exemplary resource may be an elastic search provider 410 that may be provided with the hierarchical context and which may use some or all of the context to search for relevant help content. It will be appreciated the context may focus on the current UI feature/function being accessed by a client, where searching on the current feature/function produces results to be added to the help content for the HI. Alternatively the context may identify other significant features, functions, milestones, etc. accessed in the UI. It will be appreciated by one skilled in the art that an elastic search may be used to search for many different documents/help content, and the searching may be performed as a distributed task among multiple servers all providing data back that may be combined into search results to be processed by, for example, the server managing the elastic search, and/or other entities such as the FIG. 3 retrieval client 302 or retrieval server 304. It will be appreciated APIs, e.g., a Java API or JSON (Javascript Object Notation) API, may be used to start searches, register searches (e.g., to request search updates for later matching results), retrieve data from resources 408-412, pass data between entities handling help content results, etc.

The help content resources 408-412 may all provide help content that may be used to provide help to be presented in the HI. Before help content is displayed, one operation may be to optimize/reduce 416 the various search results. In one implementation, reducing results includes retrieving all help content indexed from the multiple resources 480-412, aggregate meaningful help contents, transform contents as needed, e.g., adding or removing HTML tags, and filtering content to remove help content with a low correlation to the context, e.g., results may be ranked and low-ranking results may be excluded as being less likely to be relevant to the current client context. The optimized/reduced results may be used to update 418 the server cache. In a multi-tenant environment with multiple clients searching for help content, results may be obfuscated to anonymize the results of one client so that if another client performs a related search and content in the cache from one client search may be used to supply help content to the other client, anonymization may be used to ensure client confidential data is not inadvertently shared. In one implementation, a help content template may be used where placeholders are filled in to personalize results to the other client so it appears to originate from the other client's activity/searching. In one implementation, the server-side cache may hold help content not yet ready to be displayed by a client, e.g., if the HI is treated as a viewport into available help-content. In this implementation, some transfer of help content may be delayed until the client has modified the viewport and additional data may now be displayed. For example, a client may scroll through the help content and while scrolling, new help content may be provided as needed for display in the HI.

The optimized/reduced 416 search results may be provided 420 back to the content retrieval client. It will be appreciated a client may also maintain a help content cache, which may be updated 422 with the new optimized/reduced search content. The client cache may be used to provide relatively instantly available results and help avoid the overhead of performing a search. As discussed above with respect to the content retrieval server cache, the client help content cache may be updated as the client accesses the help content. Thus, for example, the content retrieval server may provide additional help content as the client accesses the help content already received, and the client cache may store the previous received content to accommodate the client moving back and forth through the help content. Based on help content either retrieved from a local cache and/or obtained remotely, the HI component of the browser display may be updated 424.

FIGS. 5A-5D illustrate pseudo-code 500, 520, 540, 560 according to some implementations. FIGS. 5A-5C illustrated pseudo-code for Active and Passive tracking User Interface (UI) interaction and determining corresponding Help Content to be presented or rendered in a Help Interface (HI). FIG. 5D illustrates pseudo code for an exemplary data structure to represent hierarchical context tracked during UI interaction. As discussed above, various entities involved in obtaining hierarchical context for locating help content, e.g., client, browser, help content retrieval client, help content retrieval server, etc. may use an API and/or other programming tools, objects, functions, etc. to assist with the monitoring a UI, determining the context, and obtaining help content.

In the FIGS. 5A-5C exemplary implementations assume a client operates an application program provided in a browser. Note that while exemplary implementations discussed herein speak to an application program provided in a browser, such as an Internet/web browser, it will be appreciated other application programs, whether standalone, embedded, interpreted, etc., may support an event model allowing tracking UI activity in the application program to enable dynamically determining context-aware help content as disclosed. It is not necessary that the application program be provided in a browser; rather it will be appreciated by one skilled in the art the browser is used for expository convenience since the operation of web-based/browser-based application programs is well-understood and hence one skilled in the art may apply the teachings presented herein to implement disclosed inventive concepts.

It will be appreciated the illustrated pseudocode represents concepts that may be implemented in many different programming languages that support event models or threading, and more particularly to setting/receiving notification and/or data relating to asynchronous events. For example, the illustrated pseudocode may be implemented in one or more of JavaScript, Ajax (JavaScript+XML), HTML5, C, C++, Microsoft Message Queue (MSMQ), etc. It will be appreciated these languages are exemplary and that any language providing threading and event loops/callback functions/event handlers may be used.

In FIG. 5A, the exemplary pseudocode 500, instead of adopting a conventional approach of rendering help content in the HI when requested by a client, instead event emitters are used to emit a context or metadata for a particular feature or function of an application program. A container defined with respect to the UI (e.g., within the browser-based application program), asynchronously listens 502 for a "helpPageContextChanged" event. This event may be configured to trigger on every user action within the UI, or may be filtered as desired, e.g., one might select certain UI interactions to be ones for which events trigger and leave others "ignored" if not help is to be identified.

As illustrated, when the even triggers, the current UI context may be derived 504. As discussed above, in various implementations, the context may simply be the UI element/feature/function/etc. that triggered the event, or it may represent some or all previous contexts, e.g., be cumulative. The context, see, e.g., FIG. 3 item 308, may be stored 506 in session storage. It will be appreciated sessionStorage refers to storage that is only stored during one session, e.g., during operation of the application program within a browser, however in other embodiments "localStorage" may be used instead to provide for managing help content for hierarchical context to be preserved across multiple uses of the application program. In the illustrated implementation, the context is temporarily stored under the tag "helpContext", and an API (see, e.g., FIG. 3 item 318) may be called 508 to fetch help content related to the current helpContext. As illustrated, processing will "await" for the constant variable "content" to be provided help content from a helpContentRetriever.fetch function. This function may operate, as discussed above, to provide optimized/reduced help content (see, e.g., FIG. 4 item 420) which may then be used to dynamically update 510 the helpContainer object, e.g., a programming object/construct storing content for the HI.

It will be appreciated the pseudocode "async" 512 term refers, for example in JavaScript, to a function that returns to a "promise" object the eventual success (or failure) of an asynchronous operation, e.g., receiving help content responsive to the UI accesses. The "await" 514 term refers to a function waiting for completion of the asynchronous operation, e.g., receiving the help content. In the FIG. 5A implementation, help content is loaded dynamically and immediately, hence the await decision makes this an "active" functionality.

FIGS. 5B, 5C illustrate alternate implementations for obtaining hierarchically-relevant context-aware help in a non-immediate or "passive" mode. It will be appreciated a different application program may elect, some or all of the time, to not wait for an immediate update. For example, in one embodiment, the browser interface (e.g., FIG. 1 item 100) may contain the UI (e.g., FIG. 1 item 104) and HI (e.g., FIG. 1 item 110). In FIGS. 5B, 5C, the HI may be electively displayed, e.g., the client/user of the client may open/activate/make visible or close/deactivate/make non-visible the HI. In some implementations, hierarchically-relevant context-aware help content may continue to be dynamically and automatically updated within the HI (e.g., by updating, for example, the helpContainer object) even if the HI is currently closed. But in others, updating may not occur until the HI is opened/activated/made visible. In some embodiments, the non-immediate retrieval may be used to accommodate remote resources that are slow and/or require substantial processing such that help content cannot be immediate acquired. e.g., when it is necessary to render a large HTML file to identify relevant help content, process a Cascading Style Sheets (CSS) file, etc.

In the illustrated pseudocode 520, as with FIG. 5A, a container defined with respect to the UI (e.g., within the browser-based application program), and a signal framework, such as may be used by the FIG. 3 Help Content Retrieval Client 302, asynchronously listens 522 for signal events, such as a "helpPageContextChanged" event, which as discussed above may be triggered as desired based on some or all monitored accesses within the UI. When the framework receives the signal, it may update the container to notify receipt of the signal. And with each such triggering UI event, e.g., clicking on an element/object/feature/function/etc., the current UI context may be derived 524. However unlike the FIG. 5A implementation, only the context is stored 526 in session storage when triggered by the asynchronous handler for the UI "event". It will be appreciated the Help Content Retrieval Client may use a signal framework by subscribing to an existing signaling framework provided by an application program including the illustrated pseudo-code, use a signaling framework provided by, e.g., an operating system, hypervisor, or other environment or construct providing inter-process communication (IPC) to the application program, or it may provide its own signal framework.

In the illustrated FIG. 5C pseudocode 540, operations complementary to the FIG. 5A pseudocode may be performed. As illustrated an event "helpContainerOpen" 542 may be defined for the application program interface to handle detecting opening/activating/making visible the HI. When this event occurs, the context previously stored (e.g., FIG. 5B item 526) may be retrieved ("getItem") 544, and as discussed above with respect to FIG. 5A item 508, in some embodiments the application program awaits receiving the help content, and when received, updates 548 the HI with the retrieved content. Thus in some implementations, such as in accord with FIG. 5a, help content is dynamically and automatically updated in the HI, and if the HI is opened (e.g., visible within the application program interface), the help may update and change in real time as a client accesses the UI. In other implementations, such as in accord with FIGS. 5B, 5C, the hierarchical context identifier is determined and stored automatically as the client accesses the UI, and updating the HI is deferred to a later time, which typically would be no later than accessing the HI (e.g., opening/activating it), though HI content may be updated earlier, such as when the HI is not active and the client is idle.

In either the FIG. 5A or FIGS. 5B, 5C implementations, caching may be used to speed up some help retrieval. In particular, one or both caches may be pre-configured to contain an initial help context corresponding to starting the application program, where the initial help content may be focused, for example, to getting a new client familiar with basic features, functions, theories of operation, etc. for the application program. Such initial content may instead, or in addition, be stored in the HI so that it is already present for when the HI is accessed. It will be appreciated the initial content may no longer be immediately visible if, for example, a client has a closed HI and is using the program, and in the background operations may be performed to dynamically and automatically track hierarchical context identifiers for retrieving help content relevant to the client's current application program context, which may include, as discussed above, a historical context to help identify what help content is more particularly relevant to a current client context. In one implementation, a client's most recent, e.g., 3, hierarchical context identifiers may be presented to a Help Content Retrieval Server (e.g., FIG. 3 item 304) so that a Backend Search Support (e.g., FIG. 3 item 322) may provide better/more targeted results to recent client activity in the UI.

FIG. 5D illustrates exemplary pseudo code 560 according to some implementations. In the illustrated embodiment, the opening brace 562 starts a JSON-type of representation for an exemplary data structure to represent hierarchical context tracked during UI interaction discussed above with respect to FIGS. 5A-5C. As illustrated, the data structure includes key/value pairs, such as a context 564 key and a details 566 key. The context key 564 may, for example, identify functionality, e.g., an application program UI page relating to Virtual Machine (VM) management, reached by a client while accessing the application program UI, e.g., the client clicked or otherwise accessed the UI page. The details key 566 may, for example, represent options 568-572 that are available for that functionality. It will be appreciated the details may identify some or all information, options and/or settings available for functionality in a particular context. In the illustrated example, the Manage VM context includes identifying a VM that might be managed (managedObjectId 568), identifying the vmOs 570, and identifying operations 572 that might be performed, e.g., Increase VM CPU 572. It will be appreciated some or all of these details may be adjustable depending on circumstance, such as whether the VM is active or not may change when details are adjustable. If operation 572 is clicked on or otherwise accessed by a client, this would generate another context for tracking that interaction with the UI.

It will be appreciated that the contexts may be cross-referenced in a variety of ways (e.g., in a database, stacked, linked lists, recursively, etc.) so that a multi-layered sequence of UI interactions may, if desired, be known and used to affect searching that is performed. In some implementations, a current context's function/options are sent to an Elastic/other search provider for help determining help content as discussed above. With multi-layered contexts, e.g., if we tracked a context for entered VM management page, and a down-level context for Manage VM being selected in the higher-level VM management context, then both contexts may be searched for help content. Analysis of the history of contexts may predict a client is struggling with the application program, e.g., the history shows jumping around the UI, and the searching for help may also be pointed toward obtaining some results for beginner training. Predictions may be hit or miss. Therefore, subsequent client interaction may be further monitored and analyzed to determine if predictive help seemed applicable, e.g., if the client does not access predicted help then search results may filter out such prediction misses.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios. "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
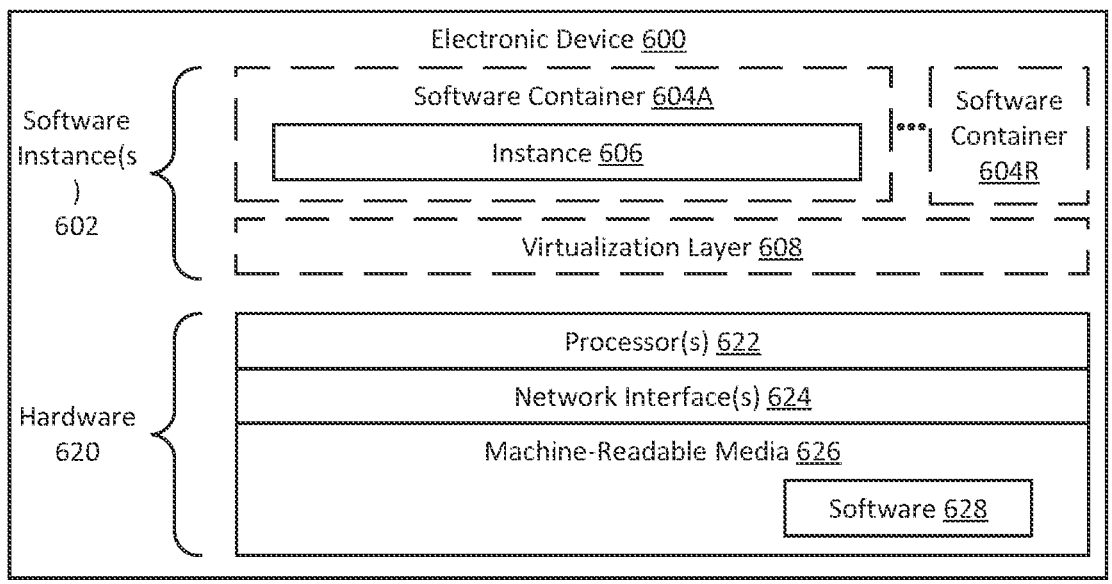
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients and the dynamically updateable context-aware help service may be implemented in one or more electronic devices 600. In one implementation: 1) each of the clients is implemented in a separate one of the electronic devices 600 (e.g., in end user devices where the software 628 represents the software to implement clients to interface directly and/or indirectly with the dynamically updateable context-aware help service (e.g., software 628 represents a web browser, a native client, a portal, a command-line interface, and/or an application programming interface (API) based upon protocols such as Simple Object Access Protocol (SOAP), Representational State Transfer (REST), etc.)); 2) the dynamically updateable context-aware help service is implemented in a separate set of one or more of the electronic devices 600 (e.g., a set of one or more server devices where the software 628 represents the software to implement the dynamically updateable context-aware help service); and 3) in operation, the electronic devices implementing the clients and the dynamically updateable context-aware help service would be communicatively coupled (e.g., by a network) and would establish between them (or through one or more other layers and/or or other services) connections for submitting hierarchical context to the help content retrieval server part of the dynamically updateable context-aware help service and returning optimized/reduced help content to the help content retrieval client part of the dynamically updateable context-aware help service. Other configurations of electronic devices may be used in other implementations (e.g., an implementation in which the client and the dynamically updateable context-aware help service are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
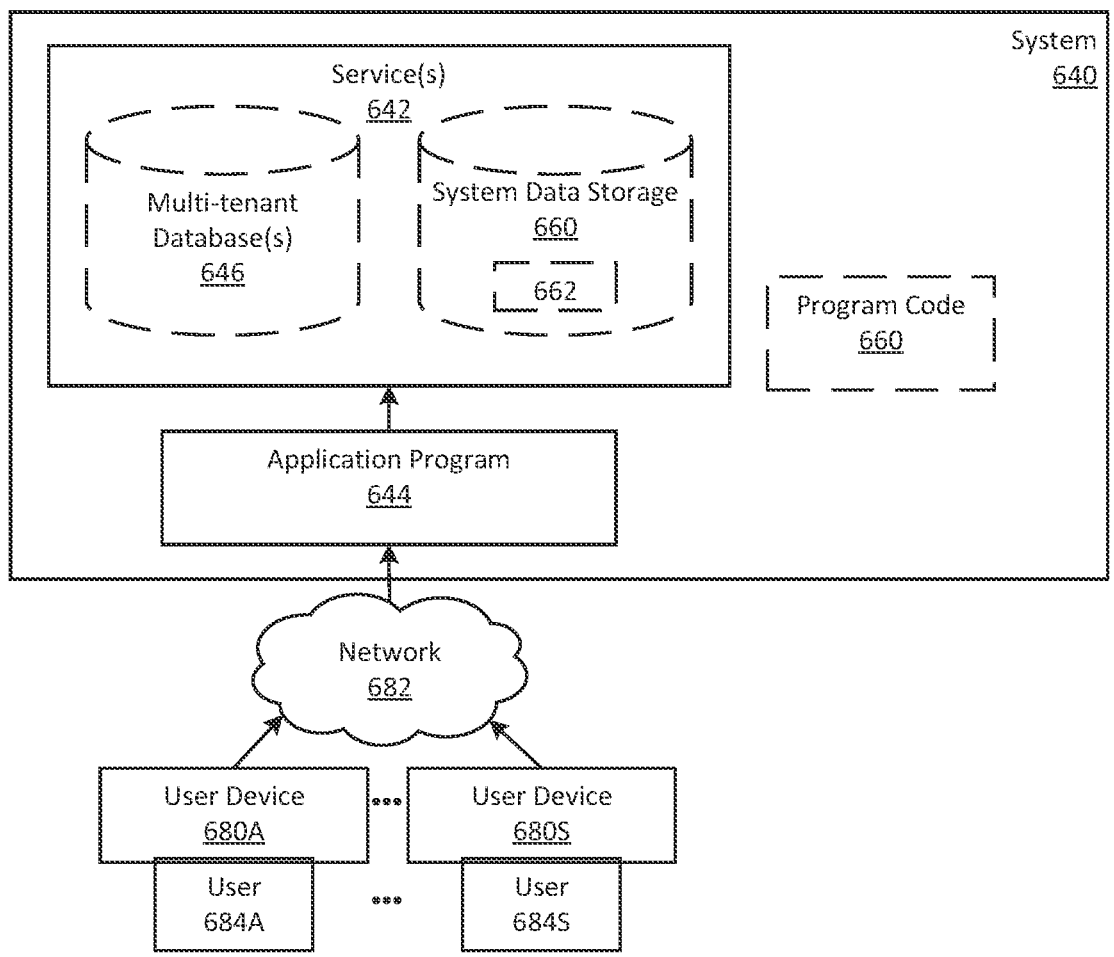
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642, including the dynamically updateable context-aware help service. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: Dynamically updateable context-aware help; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the dynamically updateable context-aware help service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP). File Transfer Protocol (FTP), Andrew File System (AFS). Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations assuming for expository convenience use of a browser to implement all or selected aspects of the dynamically updateable context-aware help service, the invention is not limited to the implementations described and can be practiced with modification and alteration within the spirit and scope of the appended claims. The description is thus illustrative instead of limiting.

What is claimed is:

1. A method for providing help to a client accessing a network based application including a user interface (UI) and a help interface (HI) to at least provide help content, comprising:
   implementing a computing platform to be coupled to the network that executes applications for the client, wherein the network-based computing platform includes the network-based application;
   providing the network-based application program to the client;
   monitoring first accesses of the UI identifying a feature of the network-based application program;
   automatically deriving a first hierarchical context identifier based at least in part on the monitoring the first accesses of the UI;
   dynamically providing a first help content based at least in part on the first hierarchical context identifier;
   monitoring second accesses of the UI also identifying the feature;
   automatically deriving a second hierarchical context identifier based at least in part on the monitoring the second accesses of the UI; and
   dynamically providing a second help content different from the first help content based at least in part on the second hierarchical context identifier.

2. The method of claim 1, in which the network-based application includes a browser, further comprising:
   determining a resource locator associated with the application program, wherein the first help content is determined based at least in part on the resource locator; and
   proximately presenting both the UI and HI in a browser page defined based at least in part on the UI and HI.

3. The method of claim 1, further comprising:
   monitoring third accesses of the UI to at least identify a change to the setting associated with the feature; and
   dynamically providing a third help content based at least in part on the change to the setting.

4. The method of claim 1, further comprising:
   determining a first event in the network application after the first accesses; and
   dynamically updating the first help content based at least in part on the first event.

5. The method of claim 3, wherein:
   a first UI traversal corresponds to the first accesses to reach the feature;
   a second UI traversal corresponds to the second accesses to reach the feature; and
   dynamically providing the third help content based at least in part on a difference between the first and second UI traversal.

6. The method of claim 1, further comprising:
   optimizing the first help content based at least in part on one or more characteristic associated with the client.

7. The method of claim 6, wherein the optimizing includes determining the one or more characteristic includes one or more of:
- an experience level of the client;
- a repeated request for help for an event of the application program;
- a looping traversal of the UI;
- a number of operations taken to reach the event; and
- a duration spent at the event.

8. The method of claim 1, wherein the monitoring first accesses of the UI comprises:
- determining at least one milestone operation reached during the accesses of the UI;
- updating the first hierarchical context identifier based at least in part on the milestone; and
- dynamically updating the first help content based on the reaching the milestone.

9. The method of claim 1, further comprising:
- searching for help based at least in part on the first hierarchical context identifier to determine raw results data;
- analyzing the raw results data to identify at least one dimension to the raw data;
- collating the raw data, into a collated data, based at least in part on the analyzing; and
- reducing the collated data into a reduced data;
- wherein dynamically providing the first help content is based at least in part on the reduced data.

10. The method of claim 9, further comprising:
- caching in a cache an initial help data to present to the HI;
- hiding the HI without discarding the first help content; and
- automatically replacing the initial help data after based at least in part on the monitoring first accesses of the UI and a value of the setting associated with the feature.

11. A non-transitory machine-readable storage medium that provides instructions for providing help to a client accessing a network based application including a user interface (UI) and a help interface (HI) to at least provide help content, the instructions, if executed by a processor, are configurable to cause said processor to perform operations comprising:
- providing a network-based application program to the client;
- monitoring first accesses of the UI identifying at least a feature of the network-based application program;
- automatically deriving a first hierarchical context identifier based at least in part on the monitoring the first accesses of the UI and a value of a setting associated with the feature;
- dynamically providing a first help content based on the first hierarchical context identifier;
- monitoring second accesses of the UI also identifying the feature;
- automatically deriving a second hierarchical context identifier based at least in part on the monitoring the second accesses of the UI; and
- dynamically providing a second help content different from the first help content based at least in part on the second hierarchical context identifier.

12. The medium of claim 11, in which the instructions further include instructions that, if executed by the processor are configurable to cause said processor to perform operations comprising:
- providing a browser;
- determining a resource locator associated with the application program, wherein the first help content is determined based at least in part on the resource locator; and
- proximately presenting both the UI and HI in a browser page defined based at least in part on the UI and HI.

13. The medium of claim 11, further comprising:
- monitoring third accesses of the UI to at least identify the setting associated with the feature; and
- dynamically providing a third help content based at least in part on a change to the setting.

14. The medium of claim 13, in which the instructions further include instructions that, if executed by the processor are configurable to cause said processor to perform operations comprising:
- determining a first event in the network application after the first accesses; and
- dynamically updating the first help content based at least in part on the first event.

15. The medium of claim 11, in which the instructions further include instructions that, if executed by the processor are configurable to cause said processor to perform operations comprising:
- optimizing the first help content based at least in part on one or more characteristic associated with the client;
- wherein the optimizing including selecting the one or more characteristic from a set of characteristics including an experience level of the client, a repeated request for help for an event of the application program, a looping traversal of the UI, a number of operations taken to reach the event, or a duration spent at the event.

16. The medium of claim 11, in which the instructions for monitoring the first accesses of the UI further include instructions that, if executed by the processor are configurable to cause said processor to perform operations comprising:
- determining at least one milestone operation reached during the accesses of the UI;
- updating the first hierarchical context identifier based at least in part on the milestone; and
- dynamically updating the first help content based on the reaching the milestone.

17. The medium of claim 11, in which the instructions further include instructions that, if executed by the processor are configurable to cause said processor to perform operations comprising:
- searching for help based at least in part on the first hierarchical context identifier to determine raw results data;
- analyzing the raw results data to identify at least one dimension to the raw data;
- collating the raw data, into a collated data, based at least in part on the analyzing;
- reducing the collated data into a reduced data;
- dynamically updating the first help content is based at least in part on the reduced data;
- caching in a cache an initial help data to present to the HI;
- hiding the HI without discarding the first help content; and
- automatically replacing the initial help data after based at least in part on the monitoring first accesses of the UI and the value of the setting associated with the feature.

18. An apparatus comprising:
- a set of one or more processors; and
- a non-transitory machine-readable storage medium that provides instructions for providing help to a client accessing a network-based application including a user interface (UI) and a help interface (HI), the instructions, if executed by the set of one or more processors, are configurable to cause the apparatus to perform operations comprising,
providing a network-based application program to the client,
monitoring first accesses of the UI identifying at least a feature of the network-based application program,
automatically deriving a first hierarchical context identifier based at least in part on the monitoring the first accesses of the UI,
dynamically providing a first help content based at least in part on the first hierarchical context identifier,
monitoring second accesses of the UI also identifying the feature,
automatically deriving a second hierarchical context identifier based at least in part on the monitoring the second accesses of the UI, and
dynamically providing a second help content different from the first help content based at least in part on the second hierarchical context identifier.

19. The apparatus of claim 18, in which the instructions further include instructions that are configurable to cause said set of one or more processors to perform operations comprising:
providing a browser;
determining a resource locator associated with the application program, wherein the first help content is determined based at least in part on the resource locator; and
proximately presenting both the UI and HI in a browser page defined based at least in part on the UI and HI.

20. The apparatus of claim 18, in which the instructions further include instructions that are configurable to cause said set of one or more processors to perform operations comprising:
monitoring third accesses of the UI to at least identify the setting associated with the feature.

21. The apparatus of claim 20, in which the instructions further include instructions that are configurable to cause said set of one or more processors to perform operations comprising
determining a first event in the network application after the first accesses; and
dynamically updating the first help content based at least in part on the first event.

22. The apparatus of claim 18, in which the instructions further include instructions that are configurable to cause said set of one or more processors to perform operations comprising:
optimizing the first help content based at least in part on one or more characteristic associated with the client;
wherein the optimizing including selecting the one or more characteristic from a set of characteristics including an experience level of the client, a repeated request for help for an event of the application program, a looping traversal of the UI, a number of operations taken to reach the event, or a duration spent at the event.

23. The apparatus of claim 18, in which the instructions for monitoring the first accesses of the UI further include instructions that are configurable to cause said set of one or more processors to perform operations comprising:
determining at least one milestone operation reached during the accesses of the UI;
updating the first hierarchical context identifier based at least in part on the milestone; and
dynamically updating the first help content based on the reaching the milestone.

24. The apparatus of claim 18, in which the instructions further include instructions that are configurable to cause said set of one or more processors to perform operations comprising:
searching for help based at least in part on the first hierarchical context identifier to determine raw results data;
analyzing the raw results data to identify at least one dimension to the raw data;
collating the raw data, into a collated data, based at least in part on the analyzing;
reducing the collated data into a reduced data;
dynamically updating the first help content is based at least in part on the reduced data;
caching in a cache an initial help data to present to the HI;
hiding the HI without discarding the first help content; and
automatically replacing the initial help data after based at least in part on the monitoring first accesses of the UI and a value of the setting associated with the feature.

* * * * *